US006895089B2

(12) United States Patent
Wang

(10) Patent No.: US 6,895,089 B2
(45) Date of Patent: May 17, 2005

(54) POTS SPLITTER WITH LINE IMPEDANCE MATCHING

(75) Inventor: Jie Dong Wang, Irvine, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 207 days.

(21) Appl. No.: 10/017,353

(22) Filed: Dec. 14, 2001

(65) Prior Publication Data

US 2003/0112961 A1 Jun. 19, 2003

(51) Int. Cl.$^7$ .......................... H04M 1/00; H04M 9/00
(52) U.S. Cl. .......................... 379/387.01; 379/387.02; 379/399.01; 379/398; 379/402; 379/93.05; 379/93.09; 379/412; 379/413.02; 379/413.03; 379/413.04
(58) Field of Search .............. 379/399.01, 387.01–397; 330/172, 177, 178

(56) References Cited

U.S. PATENT DOCUMENTS

| | | | |
|---|---|---|---|
| 4,447,679 A | | 5/1984 | Kojima et al. |
| 4,620,069 A | | 10/1986 | Godwin et al. |
| 4,766,402 A | | 8/1988 | Crane |
| 4,823,383 A | * | 4/1989 | Cardot et al. ............... 379/412 |
| 5,195,232 A | | 3/1993 | Frederick |
| 5,528,630 A | | 6/1996 | Ashley et al. |
| 5,539,820 A | * | 7/1996 | Pistilli ........................ 379/412 |
| 5,559,854 A | | 9/1996 | Suzuki |
| 5,598,455 A | | 1/1997 | Bliven et al. |
| 5,623,543 A | | 4/1997 | Cook |
| 5,757,803 A | | 5/1998 | Russell et al. |
| 5,764,727 A | | 6/1998 | Toumani et al. |
| 5,883,941 A | | 3/1999 | Akers |
| 5,956,385 A | | 9/1999 | Soto et al. |
| 5,974,139 A | | 10/1999 | McNamara et al. |
| 6,067,316 A | | 5/2000 | Amrany et al. |

(Continued)

FOREIGN PATENT DOCUMENTS

| | | | |
|---|---|---|---|
| EP | 0317852 | 5/1989 | |
| EP | 0814620 | 12/1997 | |
| EP | 0891067 | 1/1999 | |
| EP | 0909102 | 4/1999 | |
| EP | 0923221 | 6/1999 | |
| EP | 1117217 A2 * | 8/2001 | ........... H04L/27/00 |

OTHER PUBLICATIONS

Williams "Electronic Filter Design", 1981, McGraw–Hill Book Company, Chapter 3, pp. 3–1 to 3–7; Chapter 8, pp. 8–9 to 9–20.*

Budak, "Passive and Active Network Analysis and Synthesis"; 1974, Houghton Mifflin Company, Boston, pp. 543–545.*

*Primary Examiner*—Forester W. Isen
*Assistant Examiner*—Ramnandan Singh
(74) *Attorney, Agent, or Firm*—Fogg and Associates, LLC; Jon M. Powers

(57) ABSTRACT

Resistance in parallel with inductors in a series leg of the low-pass filter facilitates changing input and output resistance of the filter with little or no change in the reactance of the inductors. Furthermore, the reactance of the capacitors in the shunt legs of the filter will be substantially unaffected. This assists the designer in matching the impedance of the filter in the pass-band while still providing substantial impedance mismatching in the stop-band without substantially affecting the characteristics of the filter. Facilitating impedance matching in the pass-band and impedance mismatching in the stop-band is accomplished without the need for more complex active components. POTS splitters making use of such filters can facilitate impedance matching of line and load termination in a telecommunications system in response to signals within the frequencies of typical analog telephony service while providing impedance mismatching in response to signals within the frequencies of typical xDSL service.

111 Claims, 5 Drawing Sheets

U.S. PATENT DOCUMENTS

| | | | |
|---|---|---|---|
| 6,069,899 A | 5/2000 | Foley | |
| 6,137,880 A * | 10/2000 | Bella | 379/399.01 |
| 6,144,399 A | 11/2000 | Manchester et al. | |
| 6,144,735 A | 11/2000 | Bella | |
| 6,178,080 B1 | 1/2001 | Wilken et al. | |
| 6,192,109 B1 | 2/2001 | Amrany et al. | |
| 6,208,637 B1 | 3/2001 | Eames | |
| 6,259,676 B1 | 7/2001 | Kellock et al. | |
| 6,278,769 B1 | 8/2001 | Bella | |
| 6,282,204 B1 | 8/2001 | Balatoni et al. | |
| 6,285,754 B1 | 9/2001 | Sun et al. | |
| 6,295,343 B1 | 9/2001 | Hjartarson | |
| 6,298,037 B1 * | 10/2001 | Sharifi | 370/210 |
| 6,301,337 B1 * | 10/2001 | Scholtz et al. | 379/93.06 |
| 6,314,102 B1 | 11/2001 | Czerwiec et al. | |
| 6,324,212 B1 | 11/2001 | Jenness | |
| 6,373,923 B1 | 4/2002 | Williamson et al. | |
| 6,470,046 B1 | 10/2002 | Scott et al. | |
| 6,477,238 B1 | 11/2002 | Schneider et al. | |
| 6,496,566 B1 | 12/2002 | Posthuma | |
| 6,574,309 B1 | 6/2003 | Chea, Jr. et al. | |
| 6,621,831 B1 | 9/2003 | Linz | |
| 2001/0033650 A1 | 10/2001 | Wilson et al. | |

* cited by examiner

POTS SPLITTER WITH LINE IMPEDANCE MATCHING

TECHNICAL FIELD OF THE INVENTION

The present invention relates generally to telecommunications, and in particular to apparatus and methods to facilitate line impedance matching in a POTS splitter.

BACKGROUND OF THE INVENTION

A variety of telecommunication systems utilize traditional telephone company local subscriber loops to carry high rate digital transmissions. Examples include a variety of digital subscriber loop (DSL) services, such as high-rate DSL (HDSL), asymmetric DSL (ADSL), very high-rate DSL (VDSL) and others. The varieties of DSL service will be referred to herein generally as xDSL.

The xDSL services share the same carrier with traditional analog telephony, commonly referred to as plain old telephone service (POTS). To share the same carrier, some sort of multiplexing is used. Typically, this involves frequency division multiplexing (FDM). POTS typically occupies the frequencies of between 300 and 3400 Hz while the xDSL service typically occupies some band of frequencies above the POTS service.

To isolate the POTS service from the xDSL transceiver, a splitter, or POTS splitter, is used. These splitters generally have a low-pass filter to permit passing of the POTS service and a high-pass filter to permit passing of the xDSL service. To provide maximum possible transfer of power of a signal between a source and its load, the POTS splitter must have its impedance matched to the transmission line or carrier.

For the reasons stated above, and for other reasons stated below that will become apparent to those skilled in the art upon reading and understanding the present specification, there is a need in the art for alternative apparatus and methods to facilitate line impedance matching in a POTS splitter.

SUMMARY

The various embodiments utilize resistance in parallel with the inductors in a series leg of the low-pass filter. This parallel resistance facilitates changes input and output resistance of the filter with little or no change in the reactance of the inductors. Furthermore, the reactance of the capacitors in the shunt legs of the filter will be substantially unaffected. This assists the designer in matching the impedance of the filter in the pass-band while still providing substantial impedance mismatching in the stop-band without substantially affecting the characteristics of the filter. Facilitating impedance matching in the pass-band and impedance mismatching in the stop-band is accomplished without the need for more complex active components. Various embodiments may further contain additional components that do not materially affect the basic and novel properties of the devices disclosed herein.

For one embodiment, the invention provides a low-pass filter. The filter includes a first differential mode inductor in series with a second differential mode inductor, first and second resistors in parallel with the first differential mode inductor, third and fourth resistors in parallel with the second differential mode inductor, a first capacitor in parallel with the third resistor, and a second capacitor in parallel with the fourth resistor. The filter further includes a first shunt leg interposed between the first and second differential mode inductors and coupled across the first and second differential mode inductors and a second shunt leg. The second differential mode inductor is interposed between the first and second shunt legs. For a further embodiment, the low-pass filter is a passive low-pass filter. For a still further embodiment, a common mode inductor is coupled between the second shunt leg and the second differential mode inductor.

For another embodiment, the invention provides a low-pass filter. The filter includes a first differential mode inductor in series with a second differential mode inductor, a first resistor in parallel with a first winding of the first differential mode inductor, a second resistor in parallel with a second winding of the first differential mode inductor, a third resistor in parallel with a first winding of the second differential mode inductor, a fourth resistor in parallel with a second winding of the second differential mode inductor, a first capacitor in parallel with the first winding of the second differential mode inductor, and a second capacitor in parallel with the second winding of the second differential mode inductor. The filter further includes a first shunt leg comprising a first end coupled between the first windings of the first and second differential mode inductors and a second end coupled between the second windings of the first and second differential mode inductors. The filter still further includes a second shunt leg comprising a first end coupled to the first winding of the second differential mode inductor and a second end coupled to the second winding of the second differential mode inductor. The second differential mode inductor is coupled between the first and second shunt legs. For a further embodiment, a common mode inductor is coupled between the second shunt leg and the second differential mode inductor.

For yet another embodiment, the invention provides a low-pass filter. The filter includes a first differential mode inductor in series with a second differential mode inductor, a first resistor in parallel with a first winding of the first differential mode inductor, a second resistor in parallel with a second winding of the first differential mode inductor, a third resistor in parallel with a first winding of the second differential mode inductor, a fourth resistor in parallel with a second winding of the second differential mode inductor, a first capacitor in parallel with the first winding of the second differential mode inductor and the third resistor, and a second capacitor in parallel with the second winding of the second differential mode inductor and the fourth resistor. The filter further includes a first shunt leg comprising a first end coupled between the first windings of the first and second differential mode inductors and a second end coupled between the second windings of the first and second differential mode inductors. The filter still further includes a second shunt leg. The second differential mode inductor is coupled between the first and second shunt legs. For a further embodiment, a common mode inductor is coupled between the second shunt leg and the second differential mode inductor.

For one embodiment, the invention provides a POTS splitter. The splitter includes a high-pass filter for coupling between an xDSL in port and an xDSL out port and a low-pass filter for coupling between the xDSL out port and a POTS port. The low-pass filter includes a first differential mode inductor in series with a second differential mode inductor between the POTS port and the xDSL out port, first and second resistors in parallel with the first differential mode inductor, third and fourth resistors in parallel with the second differential mode inductor, a first capacitor in parallel with the third resistor, a second capacitor in parallel with the fourth resistor, a first shunt leg interposed between the first and second differential mode inductors and coupled across the first and second differential mode inductors, and a second shunt leg coupled across the second differential mode inductor.

For another embodiment, the invention provides telecommunications system. The system includes a carrier, a high-pass filter coupled between the carrier and an xDSL transceiver, and a low-pass filter coupled between the carrier and a POTS transceiver. The low-pass filter includes a first differential mode inductor in series with a second differential mode inductor between the POTS transceiver and the carrier, first and second resistors in parallel with the first differential mode inductor, third and fourth resistors in parallel with the second differential mode inductor, a first capacitor in parallel with the third resistor, a second capacitor in parallel with the fourth resistor, a first shunt leg interposed between the first and second differential mode inductors and coupled across the first and second differential mode inductors, and a second shunt leg coupled across the second differential mode inductor. For a further embodiment, a common mode inductor is coupled between the second shunt leg and the second differential mode inductor.

For yet another embodiment, the invention provides a method of impedance matching in a POTS splitter of a telecommunications system for sharing a common carrier between xDSL service and POTS service. The method includes passing a first signal on a tip line between a POTS transceiver and the carrier, wherein the first signal passes through a first winding of a first differential mode inductor and a first winding of a second differential mode inductor in series while a first resistance is in parallel with the first winding of the first differential mode inductor, a second resistance is in parallel with the first winding of the second differential mode inductor and a first capacitance is in parallel with the first winding of the second differential mode inductor and the second resistance. The method further includes passing a second signal on a ring line between a POTS transceiver and the carrier, wherein the second signal passes through a second winding of the first differential mode inductor and a second winding of the second differential mode inductor in series while a third resistance is in parallel with the second winding of the first differential mode inductor, a fourth resistance is in parallel with the second winding of the second differential mode inductor and a second capacitance is in parallel with the second winding of the second differential mode inductor and the fourth resistance.

Further embodiments of the invention include apparatus and methods of varying scope.

DETAILED DESCRIPTION

Figure 1:
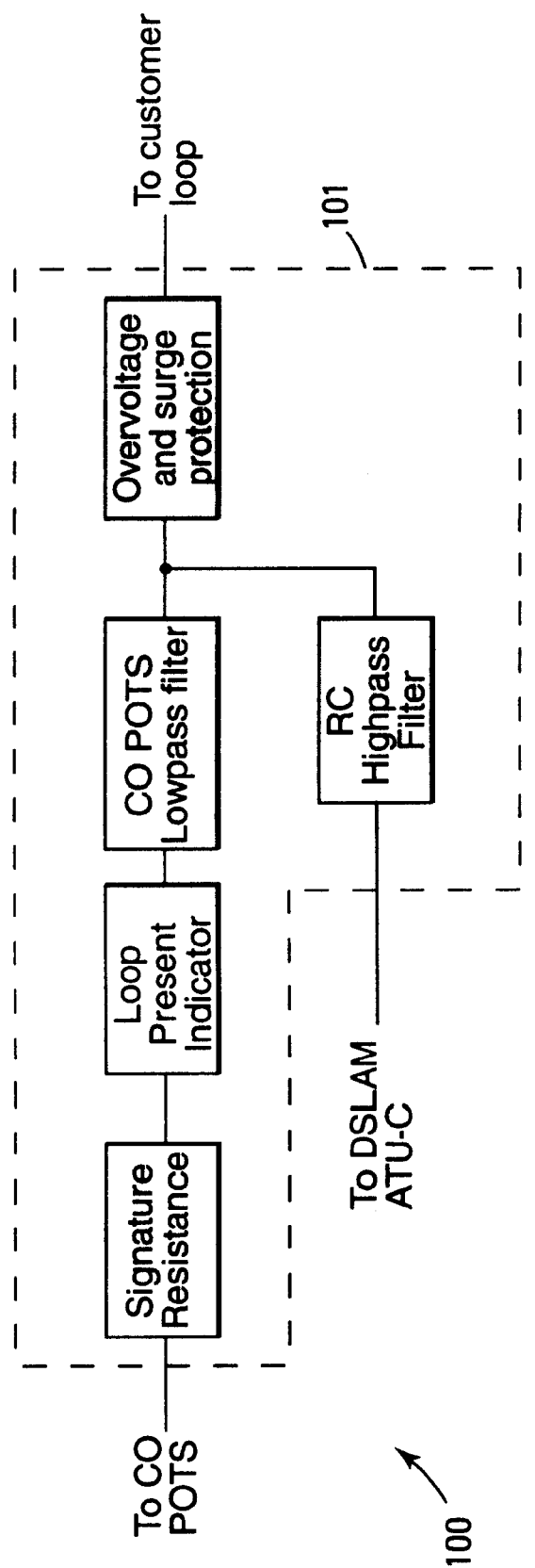
FIG. 1 is a block diagram of a communication network having a POTS splitter in accordance with an embodiment of the invention.

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, electrical or mechanical changes may be made without departing from the scope of the present invention. The following detailed description is, therefore, not to be taken in a limiting sense, and the scope of the present invention is defined only by the appended claims and equivalents thereof.

Impedance matching is necessary in the design of POTS splitters to provide the maximum possible transfer of signal power between a source and its load. Mismatched impedance in the transmission line can cause signal reflection, echo return and power loss. The maximum transfer power of a signal, from a source to its load, occurs when load impedance is equal to the complex conjugate of the source impedance. In other words, the impedance of source and load have the same real part and opposite reactance.

However, the designer generally does not have the ability to change the filter input and output impedance by changing the values of impedance (L) and capacitance (C) when the coefficient of the filter is calculated. Changing the values of L and C in the filter will change the cutoff frequency and attenuation of frequency response of the filter. Modifications of the input and output impedance can be accomplished using active filtering, but such complexity can lead to higher failure rates of installed splitters. Moreover, the use of active circuits in the filter can interfere with lifeline POTS support. Such lifeline POTS service is generally required by telephony companies for emergency access of the telecommunications system.

For one embodiment, filter impedance is modified by adding parallel resistors with the inductors in the series leg of the filter. This changes input and output resistance of a filter without changing the reactance of the inductors in the series leg if the quality, Q, is greater than 10. If Q is less than 10, reactance of the inductors will see little change. Furthermore, the reactance of the capacitors in the shunt legs of the filter will be substantially unaffected. Therefore, it will generally not change the characteristics of the filter to add parallel resistors to the inductors.

The various embodiments help facilitate impedance matching in a POTS splitter for the pass-band of the low-pass filter portion while facilitating impedance mismatching in the stop-band of the low-pass filter. Various embodiments include two pairs of resistors in parallel with differential mode inductors in a fourth-order low-pass filter. By transforming a parallel circuit into the equivalent series resistor and inductance circuit, several tens of ohms resistance can be added to the splitter in the pass-band to improve line impedance matching and several kilo-ohms resistance can be added to the splitter in the stop-band to accelerate the impedance mismatching. The circuit sees an effective filter resistance that is larger than what is actually present. This allows fine tuning of the insertion loss, return loss and voice band attenuation due to the change of line impedance matching. It also accelerates the impedance mismatching in the xDSL band to improve attenuation. In addition, the network's quality factor, Q, can be decreased, gain overshoot in the frequency response can be reduced and bandwidth can be increased through proper selection of the parallel resistance values.

FIG. 1 is a block diagram of a communication network 100 having a POTS splitter 101 coupled between a customer loop, or local loop carrier, and a central office (CO) POTS transceiver and DSL transceiver, such as a DSL access multiplexer (DSLAM) ADSL transceiver unit (ATU). The primary components of the POTS splitter 101 include the CO POTS low-pass filter and the RC high-pass filter. Typically, the POTS splitter 101 would contain only the capacitive portion of the high-pass filter, relying on modem circuitry to provide the resistive portion. Additional circuitry may include overvoltage and surge protection, a loop present indicator and a signature resistance. The POTS splitter 101 includes a low-pass filter in accordance with an embodiment of the invention.

Figure 2:
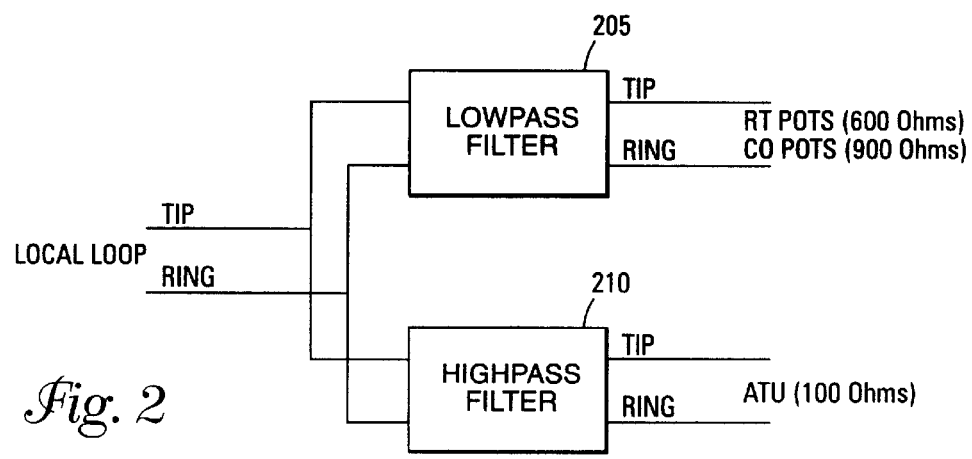
FIG. 2 is a block diagram of a POTS splitter showing additional detail on the connections between the various carriers in accordance with an embodiment of the invention.

FIG. 2 is a block diagram of a POTS splitter 101 showing additional detail on the connections between the various carriers. The POTS splitter 101 of FIG. 2 includes a low-pass filter 205, in accordance with an embodiment of the invention, having a tip line from the CO coupled to a tip line of the local loop and a ring line from the CO coupled to a ring line of the local loop. The POTS splitter 101 of FIG. 2 further includes a tip line from the CO ATU coupled to the tip line of the local loop and a ring line from the CO ATU coupled to the ring line of the local loop. For POTS systems in North America, the tip and ring lines generally present a characteristic impedance of approximately 900Ω for incoming signals and approximately 600Ω or less for the return signals. The ATU will typically present a characteristic impedance of approximately 100Ω.

Figure 3:
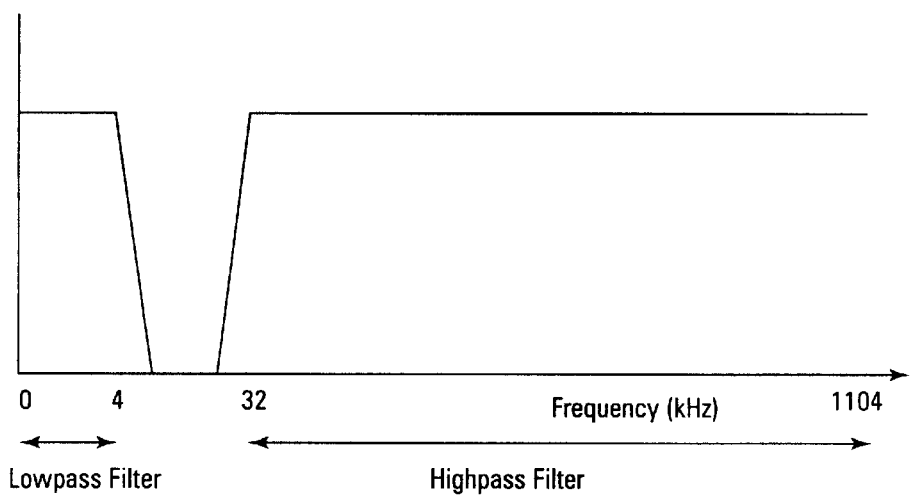
FIG. 3 is a graph depicting the pass-bands and stop-band generally used for a POTS splitter.

FIG. 3 is a graph depicting the pass-bands and stop-band generally used for a POTS splitter 101. The low-pass filter has a pass-band of approximately 0–4 kHz while the high-pass filter has a pass-band of approximately 32 kHz and above. The stop-band for the low-pass filter is generally anything above its pass-band, particularly 32 kHz or above, while the stop-band for the high-pass filter is generally anything below its pass-band, particularly 4 kHz or below.

Figure 4A:
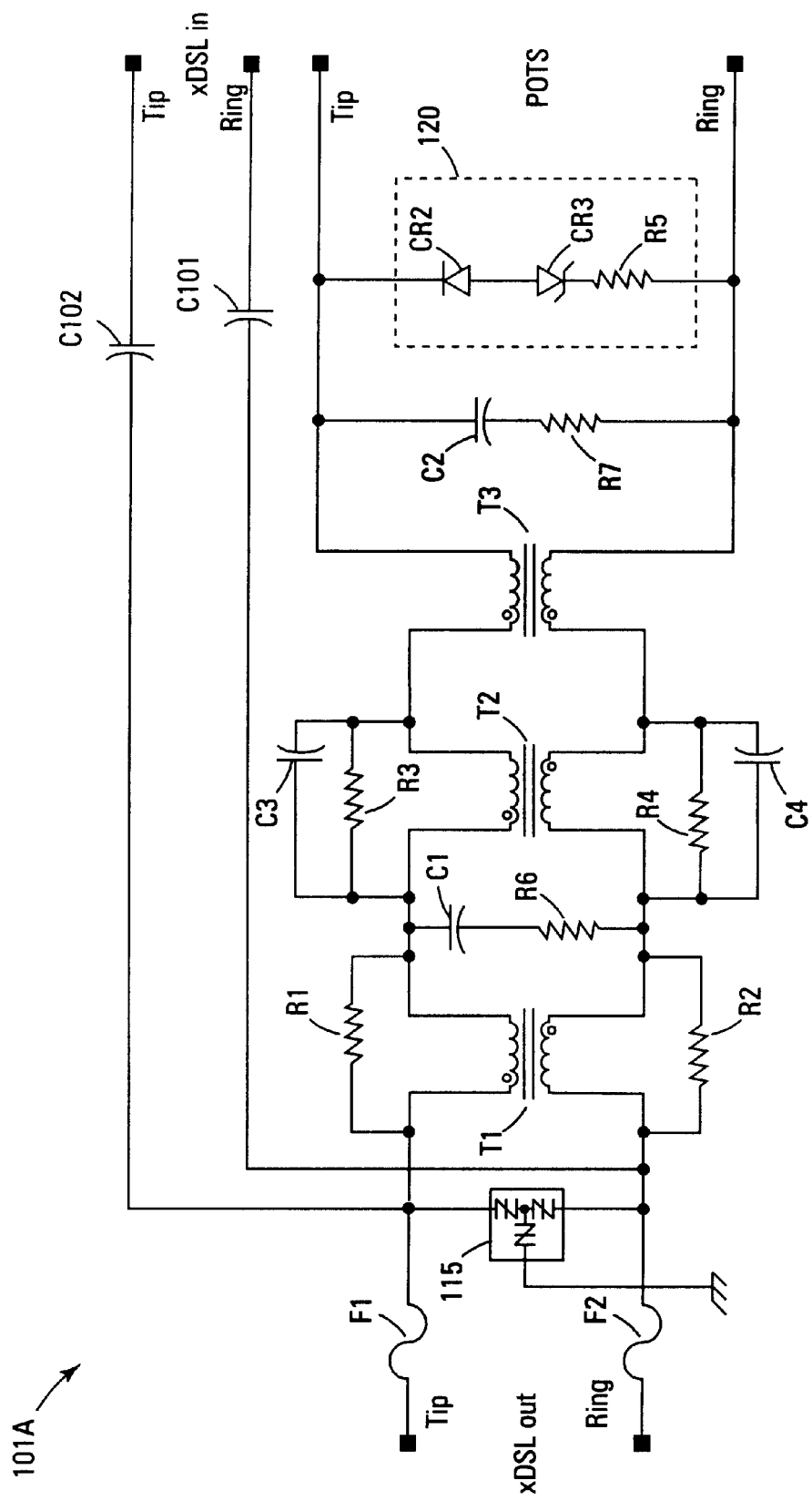
FIGS. 4A–4B are schematics of POTS splitters in accordance with embodiments of the invention.

FIG. 4A is a schematic of a POTS splitter 101A in accordance with an embodiment of the invention. The POTS splitter 101A of FIG. 4A includes a high-pass filter including capacitors C101 and C102 coupled between the ring and tip lines, respectively, of an xDSL in port, e.g., the CO ATU or other DSL transceiver, and an xDSL out port, e.g., the local loop. As noted earlier, the high-pass filter can further include resistive components (not shown) in an associated modem circuit. The POTS splitter 101A may further include a solid state voltage suppressor 115 or other over-voltage suppression circuitry coupled between the ring and tip lines of the xDSL out port. The POTS splitter 101A may include circuitry 120 coupled between the ring and tip lines of a POTS port, e.g., a CO POTS transceiver, for providing loop presence indication and signature resistance. For one embodiment, the circuitry 120 includes series-connected diode CR2, zener diode or regulator CR3 and resistor R5. Fuses F1 and F2 may be inserted in the tip and ring lines, respectively, for further surge protection. For example, F1 and F2 may represent 1.5 A fuses.

The POTS splitter 101A of FIG. 4A further includes a low-pass filter including series-connected differential mode inductors T1 and T2. For one embodiment, the inductor T1 has a higher inductance than the inductor T2. For a further embodiment, the inductors T1 and T2 have inductance values in the range of approximately 5 mH to approximately 25 mH. For one example embodiment, e.g., a European application, the inductor T1 has an inductance of approximately 22 mH while the inductor T2 has an inductance of 8 mH.

The low-pass filter is a fourth-order elliptic low-pass filter. Inductor T1 is further coupled to resistors R1 and R2, which are coupled across the tip lines and ring lines, respectively. The resistors R1 and R2 are in parallel with separate windings of the inductor T1. Inductor T2 is further coupled to resistors R3 and R4, which are coupled across the tip lines and ring lines, respectively. The resistors R3 and R4 are in parallel with separate windings of the inductor T2. Inductor T2 is still further coupled to capacitors C3 and C4, which are coupled across the tip lines and ring lines, respectively. The capacitors C3 and C4 are in parallel with the resistors R3 and R4, respectively. The resistors R1, R2, R3 and R4 are used to fine tune the filter resistance to improve impedance matching with line and load termination.

For one embodiment, the parallel resistor R1 and the parallel resistor R2 have substantially the same resistance. For a further embodiment, the parallel resistor R3 and the parallel resistor R4 have substantially the same resistance. For a still further embodiment, the parallel resistors R1 and R2 each have a lower resistance value than the parallel resistors R3 and R4. For one embodiment, the parallel resistors R1 and R2 have resistance values greater than approximately 1 kΩ. For a further embodiment, the parallel resistors R1 and R2 further have resistance values less than approximately 5 kΩ. For one embodiment, the parallel resistors R3 and R4 have resistance values greater than approximately 5 kΩ. For a further embodiment, the parallel resistors R3 and R4 further have resistance values less than or equal to approximately 30 kΩ. In one example embodiment, e.g., for a European application, parallel resistors R1 and R2 may have resistance values of approximately 3.01 kΩ and the parallel resistors R3 and R4 may have resistance values of approximately 5.62 kΩ.

For one embodiment, the parallel capacitors C3 and C4 have substantially the same capacitance. For another embodiment, the parallel capacitors C3 and C4 have capacitance values greater than approximately 0.002 μF. For a further embodiment, the parallel capacitors C3 and C4 further have capacitance values less than approximately 0.006 μF. In one example embodiment, e.g., for a European application, parallel capacitors C3 and C4 may have capacitance values of approximately 0.0056 μF.

Shunt legs may be inserted between the tip and ring lines of the low-pass filter. For one embodiment, shunt capacitor C1 may be interposed between the inductor T1 and the inductor T2 and coupled between the tip and ring lines, e.g., between the separate windings of the inductors T1 and T2. A resistor R6 may be coupled between the tip and ring lines in series with the capacitor C1. Such resistance is preferable when attempting to match the complex impedance of a European POTS system. Similarly, shunt capacitor C2 may be interposed between the inductor T2 and the POTS port and coupled between the tip and ring lines, e.g., between the windings of the inductor T2. A resistor R7 may be coupled between the tip and ring lines in series with the capacitor C2. Series resistance with the shunt capacitors is preferable when attempting to match the complex impedance of a European telephony system.

For one embodiment, the first shunt leg, i.e., C1/R6, has a lower RC constant than the second shunt leg, i.e., C2/R7. For a further embodiment, the capacitor C1 has a lower capacitance than the capacitor C2. For another embodiment, the capacitors C1 and C2 have capacitance values of approximately 0.01 μF or greater. For a further embodiment, the capacitors C1 and C2 have capacitance values of approximately 0.07 μF or less. For a still further embodiment, the resistors R6 and R7 have resistance values of approximately 70Ω or less. In one example embodiment, e.g., for a European application, capacitor C1 may have a capacitance value of approximately 0.027 µF and the capacitor C2 may have a capacitance value of approximately 0.051 µF. For such an embodiment, the resistors R6 and R7 may be in the range of approximately 20–70Ω. For one such embodiment, the resistors R6 and R7 may have resistance values of approximately 20Ω.

POTS terminals may produce common mode impulses which will pass through a differential mode filter and cause errors in the DSL modem. This may happen when going "on/off hook." POTS line cards may further produce them at the start/stop of the ringing cadence. Another source of troublesome common mode signal can be from switched mode power supplies as typically used in fax machines and laptop computers. A common mode filter can be used to help alleviate these problems.

For one embodiment, the POTS splitter 101A includes a common mode inductor T3 coupled between the POTS port and the xDSL out port, e.g., between the second shunt leg and the inductor T2. The inductor T3 has a first winding corresponding to the tip line and a second winding corresponding to the ring line. For a further embodiment, the common mode inductor T3 should be constructed such that the resonance between its inductance and interwinding capacitance is placed in the middle of the DSL band. For a still further embodiment, the inductor T3 has an inductance value of approximately 10 mH.

Figure 4B:
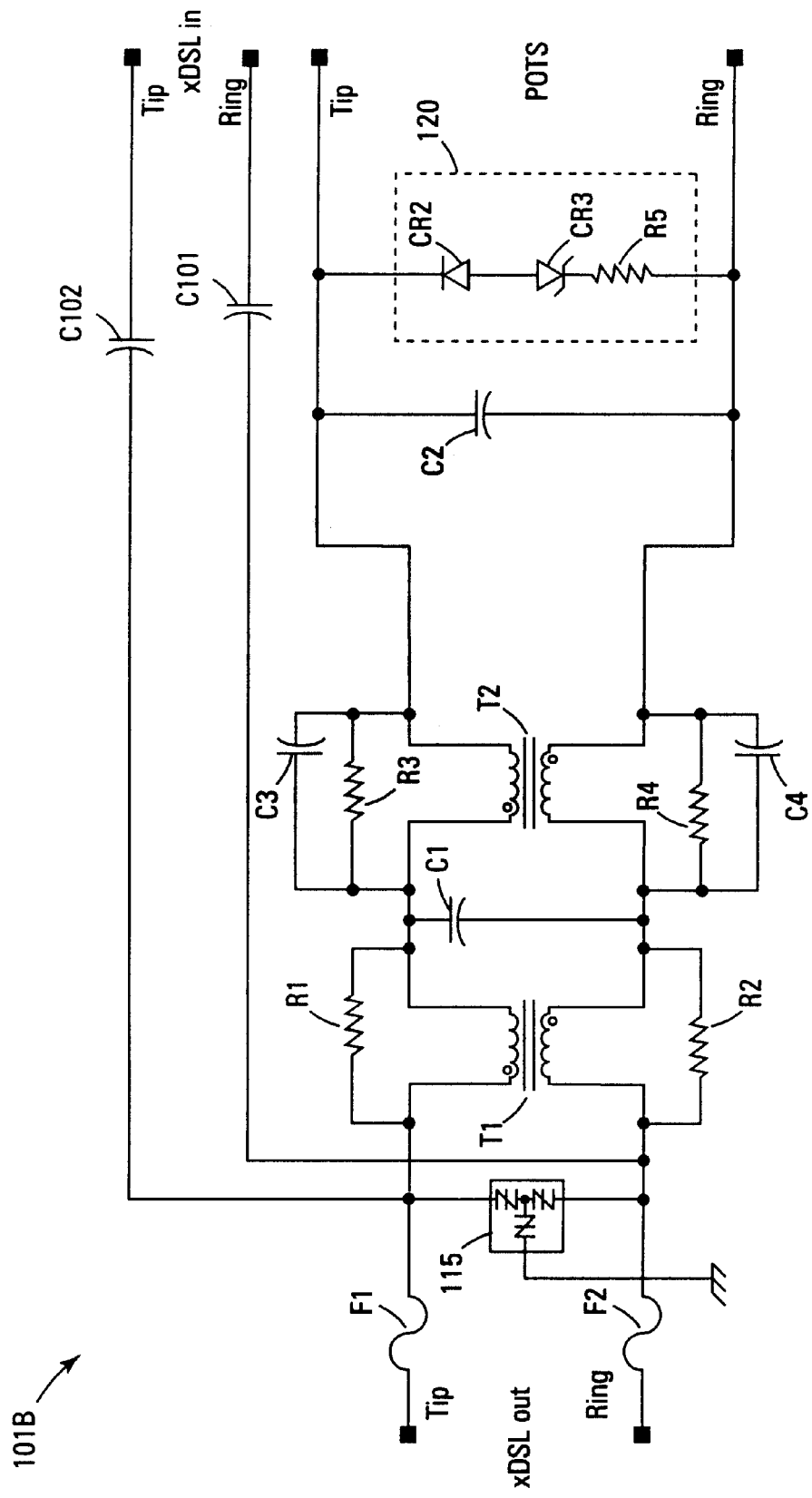

FIG. 4B is a schematic of a POTS splitter 101B in accordance with an embodiment of the invention. The POTS splitter 101B of FIG. 4B includes a high-pass filter including capacitors C101 and C102 coupled between the ring and tip lines, respectively, of an xDSL in port, e.g., the CO ATU or other DSL transceiver, and an xDSL out port, e.g., the local loop. The POTS splitter 101B may further include a solid state voltage suppressor 115 or other over-voltage suppression circuitry coupled between the ring and tip lines of the xDSL out port. The POTS splitter 101B may include circuitry 120 coupled between the ring and tip lines of a POTS port, e.g., a CO POTS transceiver, for providing loop presence indication and signature resistance. For one embodiment, the circuitry 120 includes series-connected diode CR2, zener diode or regulator CR3 and resistor R5. Fuses F1 and F2 may be inserted in the tip and ring lines, respectively, for further surge protection. For example, F1 and F2 may represent 1.5 A fuses.

The POTS splitter 101B of FIG. 4B further includes a low-pass filter including series-connected differential mode inductors T1 and T2. For one embodiment, the inductor T1 has a higher inductance than the inductor T2. For a further embodiment, the inductors T1 and T2 have inductance values in the range of approximately 5 mH to approximately 25 mH. For an example embodiment, e.g., a North America application, the inductors T1 and T2 each have an inductance of approximately 21 mH.

The low-pass filter is a fourth-order elliptic low-pass filter. Inductor T1 is further coupled to resistors R1 and R2, which are coupled across the tip lines and ring lines, respectively. The resistors R1 and R2 are in parallel with separate windings of the inductor T1. Inductor T2 is further coupled to resistors R3 and R4, which are coupled across the tip lines and ring lines, respectively. The resistors R3 and R4 are in parallel with separate windings of the inductor T2. Inductor T2 is still further coupled to capacitors C3 and C4, which are coupled across the tip lines and ring lines, respectively. The capacitors C3 and C4 are in parallel with the resistors R3 and R4, respectively. The resistors R1, R2, R3 and R4 are used to fine tune the filter resistance to improve impedance matching with line and load termination.

For one embodiment, the parallel resistor R1 and the parallel resistor R2 have substantially the same resistance. For a further embodiment, the parallel resistor R3 and the parallel resistor R4 have substantially the same resistance. For a still further embodiment, the parallel resistors R1 and R2 each have a lower resistance value than the parallel resistors R3 and R4. For one embodiment, the parallel resistors R1 and R2 have resistance values greater than approximately 1 kΩ. For a further embodiment, the parallel resistors R1 and R2 further have resistance values less than approximately 5 kΩ. For one embodiment, the parallel resistors R3 and R4 have resistance values greater than approximately 5 kΩ. For a further embodiment, the parallel resistors R3 and R4 further have resistance values less than or equal to approximately 30 kΩ. In one example embodiment, e.g., for North America applications, parallel resistors R1 and R2 may have resistance values in the range of approximately 4.75 kΩ to approximately 5.11 kΩ and the parallel resistors R3 and R4 may have resistance values in the range of approximately 15 kΩ to approximately 30.1 kΩ. In a further example embodiment, e.g., for a North America application, parallel resistors R1 and R2 may have resistance values of approximately 4.75 kΩ and the parallel resistors R3 and R4 may have resistance values of approximately 15 kΩ. In a still further example embodiment, e.g., for a North America application, parallel resistors R1 and R2 may have resistance values of approximately 5.11 kΩ and the parallel resistors R3 and R4 may have resistance values of approximately 30.1 kΩ.

For one embodiment, the parallel capacitors C3 and C4 have substantially the same capacitance. For another embodiment, the parallel capacitors C3 and C4 have capacitance values greater than approximately 0.002 µF. For a further embodiment, the parallel capacitors C3 and C4 further have capacitance values less than approximately 0.006 µF. In one example embodiment, e.g., for a North America application, parallel capacitors C3 and C4 may have capacitance values of approximately 0.0022 µF.

Shunt legs may be inserted between the tip and ring lines of the low-pass filter. For one embodiment, shunt capacitor C1 may be interposed between the inductor T1 and the inductor T2 and coupled between the tip and ring lines, e.g., between the separate windings of the inductors T1 and T2. Similarly, shunt capacitor C2 may be interposed between the inductor T2 and the POTS port and coupled between the tip and ring lines, e.g., between the windings of the inductor T2. In contrast to the POTS splitter 101A of FIG. 4A, the shunt legs of the POTS splitter 101B of FIG. 4B depict that the resistance in series with the shunt capacitors may be eliminated.

For one embodiment, the first shunt leg, i.e., C1, has a lower RC constant than the second shunt leg, i.e., C2. For a further embodiment, the capacitor C1 has a lower capacitance than the capacitor C2. For another embodiment, the capacitors C1 and C2 have capacitance values of approximately 0.01 µF or greater. For a further embodiment, the capacitors C1 and C2 have capacitance values of approximately 0.07 µF or less. In one example embodiment, e.g., for a North America application, capacitor C1 may have a capacitance value of approximately 0.01 µF and the capacitor C2 may have a capacitance value of approximately 0.068 µF.

Mismatched impedance in the transmission line causes signal reflection, echo return and power loss. The maximum transfer of power of a signal from a source to its load occurs when load impedance is equal to the complex conjugate of the source impedance. In other words, the impedance of the source and load should have the same real part and opposite reactance.

For North American telephony systems, the POTS splitter generally needs to pass frequencies up to 3.4 kHz with less than 0.75 dB for long loop and 1.00 dB for short loop insertion loss at 1 kHz and to attenuate at least 65 dB at a frequency range of 32 kHz to 300 kHz and 55 dB at a frequency range of 300 kHz to 1104 kHz according to the ANSI T1.413 standard. Such standards also require voice band attenuation at 0.2 to 3.4 kHz of +1.5 dB to −1.5 dB for short loop and of +0.5 dB to −1.5 dB for long loop. Such standards also require voice band attenuation at 3.4 to 4 kHz of +2.0 dB to −2.0 dB for short loop and of +1.0 dB to −1.5 dB for long loop. Attenuation should be greater than 8 dB for echo return loss (ERL), and be greater than 5 dB for both singing return loss low (SRL-L) and singing return loss high (SRL-H).

Some European telephony networks currently in operation are designed to have a characteristic impedance of around 600Ω, while others are designed around complex impedance terminations or are in a transitional phase between the two terminations. The POTS splitter generally needs to pass frequencies up to 3.4 kHz with less than 1 dB for insertion loss at 1 kHz and to attenuate at least 55 dB at frequencies 32 kHz and above according to the standard ETSI TR 101 728 V1.1.1. The absolute difference between the insertion loss at any frequency in the range 200 Hz to 4 kHz and the insertion loss at 1 kHz shall be less than 1 dB according to the standard. Similarly, attenuation of Return Loss shall be greater than 12 dB at a frequency range of 300 Hz to 3400 Hz and 8 dB at 3400 Hz to 4000 Hz. A value of 14 dB for the minimum Return Loss instead of 12 dB is desirable.

Figure 5A:
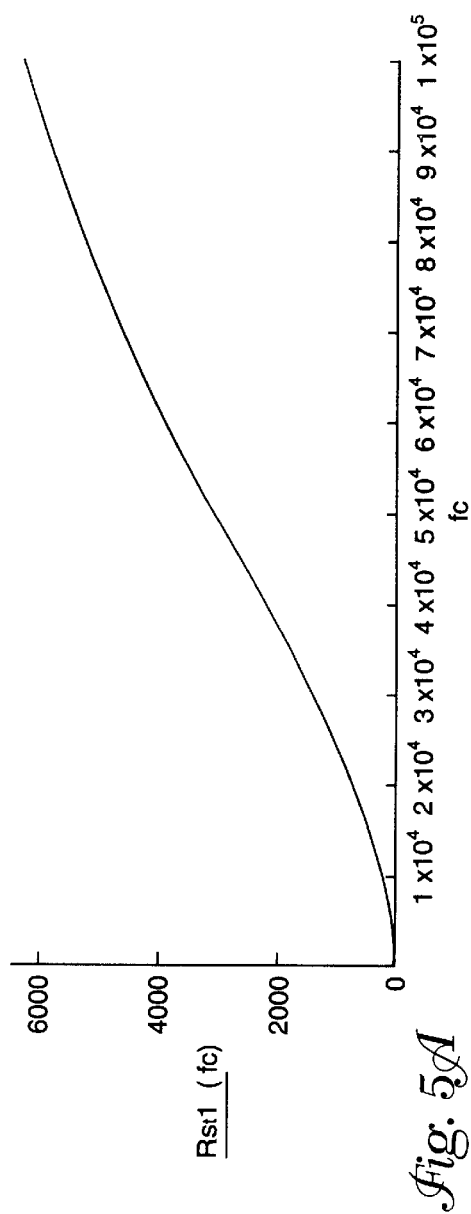
FIGS. 5A–5B are graphs showing equivalent series resistance of an inductor having parallel resistors for use with embodiments of the invention.
Figure 5B:
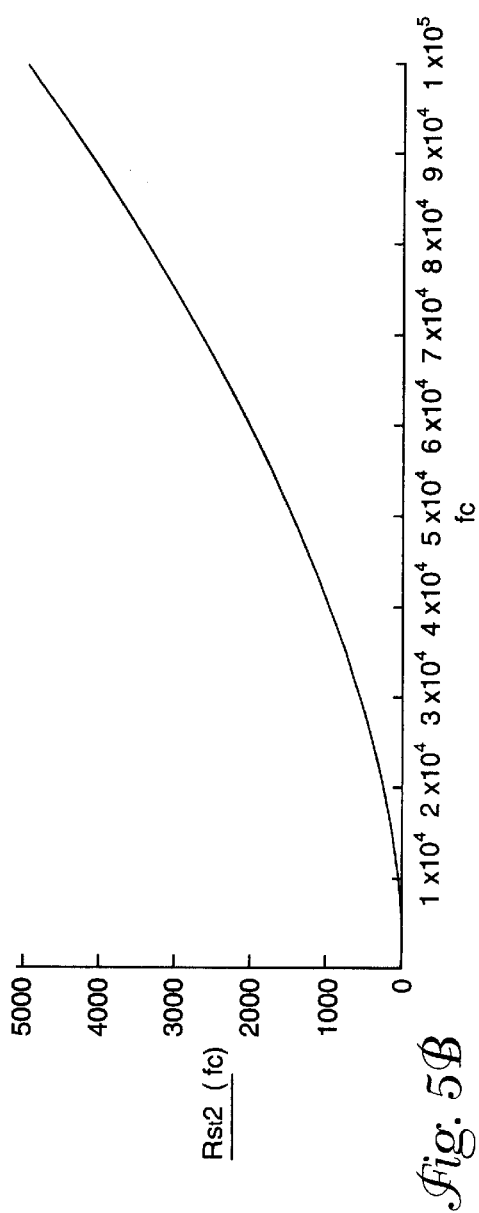

FIG. 5A is a graph showing an equivalent series resistance, Rst1, of the first inductor T1 with parallel resistors R1 and R2 as a function of frequency, fc. This graph represents the expected equivalent series resistance of 9.5 kΩ in parallel with a 21 mH inductor, e.g., two 4.75 kΩ resistors in parallel with a 21 mH inductor having a winding resistance of approximately 9Ω. For example, Rst1 is approximately 10.7Ω at 1 kHz, 38.1Ω at 4 kHz, and 1.57 kΩ at 32 kHz. FIG. 5B is a graph showing an equivalent series resistance, Rst2, of the second inductor T2 with parallel resistors R3 and R4 as a function of frequency, fc. This graph represents the expected equivalent series resistance of 30 kΩ in parallel with a 21 mH inductor, e.g., two 15 kΩ resistors in parallel with a 21 mH inductor having a winding resistance of approximately 9Ω. For example, Rst2 is approximately 9.5Ω at 1 kHz, 18.3Ω at 4 kHz, and 591Ω at 32 kHz.

Conclusion

Impedance matching is necessary in the design of POTS splitters to provide the maximum possible transfer of signal power between a source and its load. Mismatched impedance in the transmission line can cause signal reflection, echo return and power loss. The maximum transfer power of a signal, from a source to its load, occurs when load impedance is equal to the complex conjugate of the source impedance. In other words, the impedance of source and load have the same real part and opposite reactance.

The various embodiments utilize resistance in parallel with the inductors in a series leg of the low-pass filter. This parallel resistance facilitates changes input and output resistance of the filter with little or no change in the reactance of the inductors. Furthermore, the reactance of the capacitors in the shunt legs of the filter will be substantially unaffected. This assists the designer in matching the impedance of the filter in the pass-band while still providing substantial impedance mismatching in the stop-band without substantially affecting the characteristics of the filter. Facilitating impedance matching in the pass-band and impedance mismatching in the stop-band is accomplished without the need for more complex active components. Various embodiments may further contain additional components that do not materially affect the basic and novel properties of the devices disclosed herein.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A low-pass filter, comprising:
   a first differential mode inductor in series with a second differential mode inductor;
   first and second resistors in parallel with the first differential mode inductor;
   third and fourth resistors in parallel with the second differential mode inductor;
   a first capacitor in parallel with the third resistor;
   a second capacitor in parallel with the fourth resistor;
   a first shunt leg interposed between the first and second differential mode inductors and coupled across the first and second differential mode inductors; and
   a second shunt leg coupled across the second differential mode inductor.

2. The low-pass filter of claim 1, wherein the low-pass filter is a passive low-pass filter.

3. The low-pass filter of claim 1, wherein there are no interposing inductors between the first differential mode inductor and the second differential mode inductor.

4. The low-pass filter of claim 1, further comprising a common mode inductor coupled between the second shunt leg and the second differential mode inductor.

5. The low-pass filter of claim 1, wherein the first resistor and the second resistor have substantially the same resistance.

6. The low-pass filter of claim 1, wherein the third resistor and the fourth resistor have substantially the same resistance.

7. The low-pass filter of claim 1, wherein the first and second resistors each have a lower resistance value than the third and fourth resistors.

8. The low-pass filter of claim 1, wherein the first capacitor and the second capacitor have substantially the same capacitance.

9. The low-pass filter of claim 1, wherein the first shunt leg has a lower RC constant than the second shunt leg.

10. The low-pass filter of claim 1, wherein the first shunt leg further comprises a third capacitor.

11. The low-pass filter of claim 10, wherein the first shunt leg further comprises a fifth resistor in series with the third capacitor.

12. The low-pass filter of claim 10, wherein the second shunt leg further comprises a fourth capacitor.

13. The low-pass filter of claim 12, wherein the third capacitor has a lower capacitance than the fourth capacitor.

14. The low-pass filter of claim 12, wherein the first shunt leg further comprises a fifth resistor in series with the third capacitor and wherein the second shunt leg further comprises a sixth resistor in series with the fourth capacitor.

15. A low-pass filter, comprising:
   a first differential mode inductor in series with a second differential mode inductor, wherein the first differential mode inductor has an inductance value of approximately 21 mH and wherein the second differential mode inductor has an inductance value of approximately 21 mH;
   first and second resistors in parallel with the first differential mode inductor, wherein the first and second resistors each have resistance values in the range of approximately 4.75 kΩ to approximately 5.11 kΩ;
   third and fourth resistors in parallel with the second differential mode inductor, wherein the third and fourth resistors each have resistance values in the range of approximately 15 kΩ to approximately 30.1 kΩ;
   a first capacitor in parallel with the third resistor, wherein the first capacitor has a capacitance value of approximately 0.0022 µF;
   a second capacitor in parallel with the fourth resistor, wherein the second capacitor has a capacitance value of approximately 0.0022 µF;
   a first shunt leg interposed between the first and second differential mode inductors and coupled across a first and second winding of the first differential mode inductor, wherein the first shunt leg comprises a third capacitor having a capacitance value of approximately 0.01 µF; and
   a second shunt leg coupled across a first and second winding of the second differential mode inductor, wherein the second shunt leg comprises a fourth capacitor having a capacitance value of approximately 0.068 µF;
   wherein second differential mode inductor is interposed between the first shunt leg and the second shunt leg.

16. A low-pass filter, comprising:
   a first differential mode inductor in series with a second differential mode inductor, wherein the first differential mode inductor has an inductance value of approximately 22 mH and wherein the second differential mode inductor has an inductance value of approximately 8 mH;
   first and second resistors in parallel with the first differential mode inductor, wherein the first and second resistors each have a resistance value of approximately 3.01 kΩ;
   third and fourth resistors in parallel with the second differential mode inductor, wherein the third and fourth resistors each have a resistance value of approximately 5.62 kΩ;
   a first capacitor in parallel with the third resistor, wherein the first capacitor has a capacitance value of approximately 0.0056 µF;
   a second capacitor in parallel with the fourth resistor, wherein the second capacitor has a capacitance value of approximately 0.0056 µF;
   a first shunt leg interposed between the first and second differential mode inductors and coupled across a first and second winding of the first differential mode inductor, wherein the first shunt leg comprises a third capacitor having a capacitance value of approximately 0.027 µF and a fifth resistor coupled in series with the third capacitor and having a resistance value of approximately 20Ω; and
   a second shunt leg coupled across a first and second winding of the second differential mode inductor, wherein the second shunt leg comprises a fourth capacitor having a capacitance value of approximately 0.051 µF and a sixth resistor coupled in series with the fourth capacitor and having a resistance value of approximately 20Ω;
   wherein second differential mode inductor is interposed between the first shunt leg and the second shunt leg.

17. The low-pass filter of claim 16 further comprising a common mode inductor in series with the first and second differential mode inductors and interposed between the second shunt leg and the second differential mode inductor.

18. The low-pass filter of claim 17 wherein the common mode inductor has an inductance value of approximately 10 mH.

19. A low-pass filter, comprising:
   a first differential mode inductor in series with a second differential mode inductor;
   a first resistor in parallel with a first winding of the first differential mode inductor;
   a second resistor in parallel with a second winding of the first differential mode inductor;
   a third resistor in parallel with a first winding of the second differential mode inductor;
   a fourth resistor in parallel with a second winding of the second differential mode inductor;
   a first capacitor in parallel with the first winding of the second differential mode inductor;
   a second capacitor in parallel with the second winding of the second differential mode inductor;
   a first shunt leg comprising a first end coupled between the first windings of the first and second differential mode inductors and a second end coupled between the second windings of the first and second differential mode inductors; and
   a second shunt leg comprising a first end coupled to the first winding of the second differential mode inductor and a second end coupled to the second winding of the second differential mode inductor;
   wherein the second differential mode inductor is coupled between the first and second shunt legs.

20. The low-pass filter of claim 19, wherein each shunt leg consists essentially of a capacitor.

21. The low-pass filter of claim 19, wherein each shunt leg comprises a capacitor in series with a resistor.

22. The low-pass filter of claim 19, wherein the low-pass filter is a passive filter.

23. A low-pass filter, comprising:
   a first differential mode inductor in series with a second differential mode inductor;
   a common mode inductor in series with the first and second differential mode inductors;
   a first resistor in parallel with a first winding of the first differential mode inductor;
   a second resistor in parallel with a second winding of the first differential mode inductor;
   a third resistor in parallel with a first winding of the second differential mode inductor;

a fourth resistor in parallel with a second winding of the second differential mode inductor;

a first capacitor in parallel with the first winding of the second differential mode inductor;

a second capacitor in parallel with the second winding of the second differential mode inductor;

a first shunt leg comprising a first end coupled between the first windings of the first and second differential mode inductors and a second end coupled between the second windings of the first and second differential mode inductors; and a second shunt leg comprising a first end coupled to a first winding of the common mode inductor and a second end coupled to a second winding of the common mode inductor.

24. The low-pass filter of claim 23, wherein the common mode inductor is coupled between the second shunt leg and the second differential mode inductor.

25. The low-pass filter of claim 23, wherein each shunt leg consists essentially of a capacitor.

26. The low-pass filter of claim 23, wherein each shunt leg comprises a capacitor in series with a resistor.

27. The low-pass filter of claim 23, wherein the low-pass filter is a passive filter.

28. A low-pass filter, consisting essentially of:

a first differential mode inductor in series with a second differential mode inductor;

a first resistor in parallel with a first winding of the first differential mode inductor;

a second resistor in parallel with a second winding of the first differential mode inductor;

a third resistor in parallel with a first winding of the second differential mode inductor;

a fourth resistor in parallel with a second winding of the second differential mode inductor;

a first capacitor in parallel with the first winding of the second differential mode inductor and the third resistor;

a second capacitor in parallel with the second winding of the second differential mode inductor and the fourth resistor;

a first shunt leg comprising a first end coupled between the first windings of the first and second differential mode inductors and a second end coupled between the second windings of the first and second differential mode inductors; and a second shunt leg comprising a first end coupled to the first winding of the second differential mode inductor and a second end coupled to the second winding of the second differential mode inductor;

wherein the second differential mode inductor is coupled between the first and second shunt legs.

29. The low-pass filter of claim 28, wherein each shunt leg consists essentially of a capacitor.

30. The low-pass filter of claim 28, wherein each shunt leg consists essentially of a capacitor in series with a resistor.

31. A low-pass filter, consisting essentially of:

a first differential mode inductor in series with a second differential mode inductor;

a common mode inductor in series with the first and second differential mode inductors;

a first resistor in parallel with a first winding of the first differential mode inductor;

a second resistor in parallel with a second winding of the first differential mode inductor;

a third resistor in parallel with a first winding of the second differential mode inductor;

a fourth resistor in parallel with a second winding of the second differential mode inductor;

a first capacitor in parallel with the first winding of the second differential mode inductor and the third resistor;

a second capacitor in parallel with the second winding of the second differential mode inductor and the fourth resistor;

a first shunt leg comprising a first end coupled between the first windings of the first and second differential mode inductors and a second end coupled between the second windings of the first and second differential mode inductors; and a second shunt leg comprising a first end coupled to a first winding of the common mode inductor and a second end coupled to a second winding of the common mode inductor;

wherein the common mode inductor is coupled between the second shunt leg and the second differential mode inductor.

32. The low-pass filter of claim 31, wherein each shunt leg consists essentially of a capacitor.

33. The low-pass filter of claim 31, wherein each shunt leg consists essentially of a capacitor in series with a resistor.

34. A low-pass filter, comprising:

a first differential mode inductor having a first winding and a second winding;

a second differential mode inductor in series with the first differential mode inductor and having a first winding and a second winding;

a first resistance in parallel with the first winding of the first differential mode inductor;

a second resistance in parallel with the second winding of the first differential mode inductor;

a third resistance in parallel with the first winding of the second differential mode inductor;

a fourth resistance in parallel with the second winding of the second differential mode inductor;

a first capacitance in parallel with the third resistance;

a second capacitance in parallel with the fourth resistance;

a third capacitance coupled between the first and second windings of the second differential mode inductor; and a fourth capacitance coupled between the first and second windings of the second differential mode inductor;

wherein the third capacitance is interposed between the first and second differential mode inductors; and wherein the second differential mode inductor in interposed between the third and fourth capacitances.

35. The low-pass filter of claim 34, wherein the low-pass filter is substantially devoid of active components.

36. The low-pass filter of claim 34, further comprising a common mode inductor in series with the first and second differential mode inductors and having a first winding corresponding to the first windings of the first and second differential mode inductors and a second winding corresponding to the second windings of the first and second differential mode inductors.

37. The low-pass filter of claim 36, wherein the common mode inductor is interposed between the fourth capacitance and the second differential mode inductor.

38. The low-pass filter of claim 34, further comprising:

a fifth resistance in series with the third capacitance and coupled between the first and second windings of the second differential mode inductor; and a sixth resistance in series with the fourth capacitance and coupled between the first and second windings of the second differential mode inductor.

39. The low-pass filter of claim 38, further comprising a common mode inductor in series with the first and second differential mode inductors and having a first winding corresponding to the first windings of the first and second differential mode inductors and a second winding corresponding to the second windings of the first and second differential mode inductors.

40. The low-pass filter of claim 39, wherein the common mode inductor is interposed between the fourth capacitance and the second differential mode inductor.

41. A low-pass filter, comprising:
a first differential mode inductor having a first winding and a second winding;
a second differential mode inductor in series with the first differential mode inductor and having a first winding and a second winding;
a first resistance in parallel with the first winding of the first differential mode inductor;
a second resistance in parallel with the second winding of the first differential mode inductor;
a third resistance in parallel with the first winding of the second differential mode inductor;
a fourth resistance in parallel with the second winding of the second differential mode inductor;
a first capacitance in parallel with the third resistance;
a second capacitance in parallel with the fourth resistance;
a first shunt leg coupled between the first and second windings of the second differential mode inductor and comprising a third capacitance in series with a fifth resistance; and
a second shunt leg comprising a fourth capacitance in series with a sixth resistance;
wherein the first shunt leg is interposed between the first and second differential mode inductors; and
wherein the second differential mode inductor in interposed between the first and second shunt legs.

42. The low-pass filter of claim 41, wherein the second shunt leg is coupled between the first and second windings of the second differential mode inductor.

43. The low-pass filter of claim 41, further comprising a common mode inductor in series with the first and second differential mode inductors and having a first winding and a second winding.

44. The low-pass filter of claim 43, wherein the common mode inductor is interposed between the second shunt leg and the second differential mode inductor.

45. The low-pass filter of claim 41, wherein the low-pass filter consists essentially of passive components.

46. A POTS splitter, comprising:
a high-pass filter for coupling between an xDSL in port and an xDSL out port; and
a low-pass filter for coupling between the xDSL out port and a POTS port, wherein the low-pass filter comprises:
a first differential mode inductor in series with a second differential mode inductor between the POTS port and the xDSL out port;
first and second resistors in parallel with the first differential mode inductor;
third and fourth resistors in parallel with the second differential mode inductor;
a first capacitor in parallel with the third resistor;
a second capacitor in parallel with the fourth resistor;
a first shunt leg interposed between the first and second differential mode inductors and coupled across the first and second differential mode inductors; and
a second shunt leg coupled across the second differential mode inductor.

47. The POTS splitter of claim 46, further comprising overvoltage and surge protection coupled between the low-pass filter and the xDSL out port.

48. The POTS splitter of claim 46, further comprising signature resistance and loop presence indication coupled between the low-pass filter and the POTS port.

49. The POTS splitter of claim 46, further comprising a common mode inductor in series with the first and second differential mode inductors between the POTS port and the xDSL out port.

50. The POTS splitter of claim 49, wherein the common mode inductor is interposed between the second shunt leg and the second differential mode inductor.

51. The POTS splitter of claim 46, wherein the low-pass filter has a pass-band of approximately 0–4 kHz and the high-pass filter has a pass-band of approximately 32 kHz and above.

52. The POTS splitter of claim 46, wherein the low-pass filter is a passive low-pass filter.

53. The POTS splitter of claim 46, wherein the high-pass filter is an RC filter.

54. The POTS splitter of claim 53, wherein the high-pass filter comprises a capacitor coupled between a tip line of the xDSL in port and the xDSL out port and a capacitor coupled between a ring line of the xDSL in port and the xDSL out port.

55. The POTS splitter of claim 46, wherein there are no interposing inductors between the first differential mode inductor and the second differential mode inductor.

56. The POTS splitter of claim 46, wherein the first resistor and the second resistor have substantially the same resistance.

57. The POTS splitter of claim 46, wherein the third resistor and the fourth resistor have substantially the same resistance.

58. The POTS splitter of claim 46, wherein the first and second resistors each have a lower resistance value than the third and fourth resistors.

59. The POTS splitter of claim 46, wherein the first capacitor and the second capacitor have substantially the same capacitance.

60. The POTS splitter of claim 46, wherein the first shunt leg has a lower RC constant than the second shunt leg.

61. The POTS splitter of claim 46, wherein the first shunt leg further comprises a third capacitor.

62. The POTS splitter of claim 61, wherein the first shunt leg further comprises a fifth resistor in series with the third capacitor.

63. The POTS splitter of claim 61, wherein the second shunt leg further comprises a fourth capacitor.

64. The POTS splitter of claim 63, wherein the third capacitor has a lower capacitance than the fourth capacitor.

65. The POTS splitter of claim 63, wherein the first shunt leg further comprises a fifth resistor in series with the third capacitor and wherein the second shunt leg further comprises a sixth resistor in series with the fourth capacitor.

66. The POTS splitter of claim 46, wherein the second shunt leg further comprises a fourth capacitor.

67. The POTS splitter of claim 66, wherein the second shunt leg further comprises a sixth resistor in series with the fourth capacitor.

68. A POTS splitter, comprising:
a high-pass filter for coupling between an xDSL in port and an xDSL out port; and
a low-pass filter for coupling between the xDSL out port and a POTS port, wherein the low-pass filter comprises:
  a first differential mode inductor in series with a second differential mode inductor between the POTS port and the xDSL out port, wherein the first and second differential mode inductors each have inductance values in the range of approximately 5 mH to approximately 25 mH;
  first and second resistors in parallel with the first differential mode inductor, wherein the first and second resistors each have a resistance value in the range of approximately 1 kΩ to approximately 5 kΩ;
  third and fourth resistors in parallel with the second differential mode inductor, wherein the third and fourth resistors each have a resistance value in the range of approximately 5 kΩ to approximately 30 kΩ;
  a first capacitor in parallel with the third resistor, wherein the first capacitor has a capacitance value in the range of approximately 0.002 μF to approximately 0.006 μF;
  a second capacitor in parallel with the fourth resistor, wherein the second capacitor has a capacitance value in the range of approximately 0.002 μF to approximately 0.006 μF;
  a first shunt leg interposed between the first and second differential mode inductors and coupled across the first and second differential mode inductors; and
  a second shunt leg interposed between the POTS port and the second differential mode inductor;
  wherein the second shunt leg has a higher RC constant than the first shunt leg.

69. The POTS splitter of claim 68, wherein each shunt leg consists essentially of a capacitor.

70. The POTS splitter of claim 68, wherein each shunt leg comprises a capacitor in series with a resistor.

71. The POTS splitter of claim 68, wherein the second shunt leg is coupled across the second differential mode inductor.

72. The POTS splitter of claim 68, further comprising a common mode inductor in series with the first and second differential mode inductors between the POTS port and the xDSL out port.

73. The POTS splitter of claim 72, wherein the common mode inductor is interposed between the second shunt leg and the second differential mode inductor.

74. The POTS splitter of claim 72, wherein the common mode inductor has an inductance value of approximately 10 mH.

75. A POTS splitter, comprising:
a high-pass filter for coupling between an xDSL in port and an xDSL out port; and
a low-pass filter for coupling between the xDSL out port and a POTS port, wherein the low-pass filter comprises:
  a first differential mode inductor in series with a second differential mode inductor between the POTS port and the xDSL out port, wherein the first and second differential mode inductors each have inductance values in the range of approximately 5 mH to approximately 25 mH;
  first and second resistors in parallel with the first differential mode inductor, wherein the first and second resistors each have a resistance value in the range of approximately 1 kΩ to approximately 5 kΩ;
  third and fourth resistors in parallel with the second differential mode inductor, wherein the third and fourth resistors each have a resistance value in the range of approximately 5 kΩ to approximately 30 kΩ;
  a first capacitor in parallel with the third resistor, wherein the first capacitor has a capacitance value in the range of approximately 0.002 μF to approximately 0.006 μF;
  a second capacitor in parallel with the fourth resistor, wherein the second capacitor has a capacitance value in the range of approximately 0.002 μF to approximately 0.006 μF;
  a first shunt leg interposed between the first and second differential mode inductors and coupled across a first and second winding of the first differential mode inductor, wherein the first shunt leg comprises a third capacitor having a capacitance value in the range of approximately 0.01 μF to approximately 0.03 μF; and
  a second shunt leg coupled across a first and second winding of the second differential mode inductor, wherein the second shunt leg comprises a fourth capacitor having a capacitance value in the range of approximately 0.04 μF to approximately 0.07 μF;
  wherein the second differential mode inductor is interposed between the first shunt leg and the second shunt leg.

76. The POTS splitter of claim 75, further comprising a common mode inductor interposed between the POTS port and the second differential mode inductor.

77. A POTS splitter, comprising:
a high-pass filter for coupling between an xDSL in port and an xDSL out port; and
a low-pass filter for coupling between the xDSL out port and a POTS port, wherein the low-pass filter comprises:
  a first differential mode inductor in series with a second differential mode inductor between the POTS port and the xDSL out port, wherein the first and second differential mode inductors each have inductance values in the range of approximately 5 mH to approximately 25 mH;
  first and second resistors in parallel with the first differential mode inductor, wherein the first and second resistors each have a resistance value in the range of approximately 1 kΩ to approximately 5 kΩ;
  third and fourth resistors in parallel with the second differential mode inductor, wherein the third and fourth resistors each have a resistance value in the range of approximately 5 kΩ to approximately 30 kΩ;
  a first capacitor in parallel with the third resistor, wherein the first capacitor has a capacitance value in the range of approximately 0.002 μF to approximately 0.006 μF;
  a second capacitor in parallel with the fourth resistor, wherein the second capacitor has a capacitance value in the range of approximately 0.002 μF to approximately 0.006 μF;
  a first shunt leg interposed between the first and second differential mode inductors and coupled across a first and second winding of the first differential mode inductor, wherein the first shunt leg comprises a third capacitor having a capacitance value in the range of approximately 0.01 μF to approximately 0.03 μF; and a second shunt leg coupled across a first and second winding of the second differential mode inductor, wherein the second shunt leg comprises a fourth capacitor having a capacitance value in the range of approximately 0.04 µF to approximately 0.07 µF;

wherein second differential mode inductor is interposed between the first shunt leg and the second shunt leg.

78. The POTS splitter of claim 77, further comprising a common mode inductor interposed between the second shunt leg and the second differential mode inductor.

79. The POTS splitter of claim 77, further comprising:
a fifth resistor in series with the third capacitor in the first shunt leg; and
a sixth resistor in series with the fourth capacitor in the second shunt leg;
wherein the fifth and sixth resistors each have a resistance value in the range of approximately 0 to 70Ω.

80. A POTS splitter, comprising:
a high-pass filter for coupling between an xDSL in port and an xDSL out port; and
a low-pass filter for coupling between the xDSL out port and a POTS port, wherein the low-pass filter comprises:
a first differential mode inductor in series with a second differential mode inductor between the POTS port and the xDSL out port, wherein the first differential mode inductor has an inductance value of approximately 21 mH and wherein the second differential mode inductor has an inductance value of approximately 21 mH;
first and second resistors in parallel with the first differential mode inductor, wherein the first and second resistors each have resistance values in the range of approximately 4.75 kΩ to approximately 5.11 kΩ;
third and fourth resistors in parallel with the second differential mode inductor, wherein the third and fourth resistors each have resistance values in the range of approximately 15 kΩ to approximately 30.1 kΩ;
a first capacitor in parallel with the third resistor, wherein the first capacitor has a capacitance value of approximately 0.0022 µF;
a second capacitor in parallel with the fourth resistor, wherein the second capacitor has a capacitance value of approximately 0.0022 µF;
a first shunt leg interposed between the first and second differential mode inductors and coupled across a first and second winding of the first differential mode inductor, wherein the first shunt leg comprises a third capacitor having a capacitance value of approximately 0.01 µF; and
a second shunt leg coupled across a first and second winding of the second differential mode inductor, wherein the second shunt leg comprises a fourth capacitor having a capacitance value of approximately 0.068 µF;
wherein second differential mode inductor is interposed between the first shunt leg and the second shunt leg.

81. A POTS splitter, comprising:
a high-pass filter for coupling between an xDSL in port and an xDSL out port; and
a low-pass filter for coupling between the xDSL out port and a POTS port, wherein the low-pass filter comprises:
a first differential mode inductor in series with a second differential mode inductor between the POTS port and the xDSL out port, wherein the first differential mode inductor has an inductance value of approximately 22 mH and wherein the second differential mode inductor has an inductance value of approximately 8 mH;
a common mode inductor in series with the first and second differential mode inductors between the POTS port and the xDSL out port, wherein the common mode inductor has an inductance value of approximately 10 mH;
first and second resistors in parallel with the first differential mode inductor, wherein the first and second resistors each have a resistance value of approximately 3.01 kΩ;
third and fourth resistors in parallel with the second differential mode inductor, wherein the third and fourth resistors each have a resistance value of approximately 5.62 kΩ;
a first capacitor in parallel with the third resistor, wherein the first capacitor has a capacitance value of approximately 0.0056 µF;
a second capacitor in parallel with the fourth resistor, wherein the second capacitor has a capacitance value of approximately 0.0056 µF;
a first shunt leg interposed between the first and second differential mode inductors and coupled across a first and second winding of the first differential mode inductor, wherein the first shunt leg comprises a third capacitor having a capacitance value of approximately 0.027 µF and a fifth resistor coupled in series with the third capacitor and having a resistance value of approximately 20Ω; and
a second shunt leg coupled across a first and second winding of the common mode inductor, wherein the second shunt leg comprises a fourth capacitor having a capacitance value of approximately 0.051 µF and a sixth resistor coupled in series with the fourth capacitor and having a resistance value of approximately 20Ω;
wherein common mode inductor is interposed between the second shunt leg and the second differential mode inductor.

82. A POTS splitter, comprising:
a high-pass filter for coupling between an xDSL in port and an xDSL out port; and
a low-pass filter for coupling between the xDSL out port and a POTS port, wherein the low-pass filter comprises:
a first differential mode inductor in series with a second differential mode inductor between the POTS port and the xDSL out port;
a first resistor in parallel with a first winding of the first differential mode inductor, wherein the first winding of the first differential mode inductor corresponds to a tip line;
a second resistor in parallel with a second winding of the first differential mode inductor, wherein the second winding of the first differential mode inductor corresponds to a ring line;
a third resistor in parallel with a first winding of the second differential mode inductor, wherein the first winding of the second differential mode inductor corresponds to the tip line;
a fourth resistor in parallel with a second winding of the second differential mode inductor, wherein the second winding of the second differential mode inductor corresponds to the ring line;

a first capacitor in parallel with the first winding of the second differential mode inductor;

a second capacitor in parallel with the second winding of the second differential mode inductor;

a first shunt leg comprising a first end coupled between the first windings of the first and second differential mode inductors and a second end coupled between the second windings of the first and second differential mode inductors; and a second shunt leg comprising a first end coupled to the first winding of the second differential mode inductor and a second end coupled to the second winding of the second differential mode inductor;

wherein the second differential mode inductor is coupled between the first and second shunt legs.

83. The POTS splitter of claim 82, wherein each shunt leg consists essentially of a capacitor.

84. The POTS splitter of claim 82, wherein each shunt leg comprises a capacitor in series with a resistor.

85. The POTS splitter of claim 82, wherein the low-pass filter is a passive filter.

86. A POTS splitter, comprising:

a high-pass filter for coupling between an xDSL in port and an xDSL out port; and a low-pass filter for coupling between the xDSL out port and a POTS port, wherein the low-pass filter comprises:

a first differential mode inductor having a first winding and a second winding, wherein the first winding corresponds to a tip line and the second winding corresponds to a ring line;

a second differential mode inductor in series with the first differential mode inductor and having a first winding and a second winding, wherein the first winding corresponds to the tip line and the second winding corresponds to the ring line;

a first resistance in parallel with the first winding of the first differential mode inductor;

a second resistance in parallel with the second winding of the first differential mode inductor;

a third resistance in parallel with the first winding of the second differential mode inductor;

a fourth resistance in parallel with the second winding of the second differential mode inductor;

a first capacitance in parallel with the third resistance;

a second capacitance in parallel with the fourth resistance;

a third capacitance coupled between the tip line and the ring line; and a fourth capacitance coupled between the tip line and the ring line;

wherein the third capacitance is interposed between the first and second differential mode inductors; and wherein the second differential mode inductor in interposed between the third and fourth capacitances.

87. The POTS splitter of claim 86, wherein the low-pass filter is substantially devoid of active components.

88. The POTS splitter of claim 86, further comprising:

a fifth resistance in series with the third capacitance and coupled between the tip line and the ring line; and a sixth resistance in series with the fourth capacitance and coupled between the tip line and the ring line.

89. The POTS splitter of claim 88, further comprising:

a common mode inductor in series with the first and second differential mode inductors and having a first winding and a second winding, wherein the first winding corresponds to a tip line and the second winding corresponds to a ring line.

90. The POTS splitter of claim 89, wherein the common mode inductor is interposed between the fourth capacitance and the second differential mode inductor.

91. The POTS splitter of claim 86, further comprising:

a common mode inductor in series with the first and second differential mode inductors and having a first winding and a second winding, wherein the first winding corresponds to a tip line and the second winding corresponds to a ring line.

92. The POTS splitter of claim 91, wherein the common mode inductor is interposed between the fourth capacitance and the second differential mode inductor.

93. A POTS splitter, comprising:

a high-pass filter for coupling between an xDSL in port and an xDSL out port; and a low-pass filter for coupling between the xDSL out port and a POTS port, wherein the low-pass filter comprises:

a first differential mode inductor having a first winding and a second winding, wherein the first winding corresponds to a tip line and the second winding corresponds to a ring line;

a second differential mode inductor in series with the first differential mode inductor and having a first winding and a second winding, wherein the first winding corresponds to the tip line and the second winding corresponds to the ring line;

a first resistance in parallel with the first winding of the first differential mode inductor;

a second resistance in parallel with the second winding of the first differential mode inductor;

a third resistance in parallel with the first winding of the second differential mode inductor;

a fourth resistance in parallel with the second winding of the second differential mode inductor;

a first capacitance in parallel with the third resistance;

a second capacitance in parallel with the fourth resistance;

a first shunt leg coupled between the tip line and the ring line and comprising a third capacitance in series with a fifth resistance; and a second shunt leg coupled between the tip line and the ring line and comprising a fourth capacitance in series with a sixth resistance;

wherein the first shunt leg is interposed between the first and second differential mode inductors; and wherein the second differential mode inductor in interposed between the first and second shunt legs.

94. The POTS splitter of claim 93, wherein the low-pass filter consists essentially of passive components.

95. The POTS splitter of claim 93, further comprising:

a common mode inductor in series with the first and second differential mode inductors, wherein the common mode inductor is interposed between the second shunt leg and the second differential mode inductor.

96. A POTS splitter, comprising:

a high-pass filter for coupling between an xDSL in port and an xDSL out port; and a low-pass filter for coupling between the xDSL out port and a POTS port, wherein the low-pass filter comprises:

a first differential mode inductor in series with a second differential mode inductor;

a first resistor in parallel with a first winding of the first differential mode inductor;

a second resistor in parallel with a second winding of the first differential mode inductor;
a third resistor in parallel with a first winding of the second differential mode inductor;
a fourth resistor in parallel with a second winding of the second differential mode inductor;
a first capacitor in parallel with the first winding of the second differential mode inductor and the third resistor;
a second capacitor in parallel with the second winding of the second differential mode inductor and the fourth resistor;
a first shunt leg comprising a first end coupled between the first windings of the first and second differential mode inductors and a second end coupled between the second windings of the first and second differential mode inductors; and
a second shunt leg comprising a first end coupled to the first winding of the second differential mode inductor and a second end coupled to the second winding of the second differential mode inductor;
wherein the second differential mode inductor is coupled between the first and second shunt legs.

97. The POTS splitter of claim 96, wherein each shunt leg consists essentially of a capacitor.

98. The POTS splitter of claim 96, wherein each shunt leg consists essentially of a capacitor in series with a resistor.

99. A POTS splitter, consisting essentially of:
a high-pass filter for coupling between an xDSL in port and an xDSL out port; and
a low-pass filter for coupling between the xDSL out port and a POTS port, wherein the low-pass filter comprises:
a first differential mode inductor in series with a second differential mode inductor between the POTS port and the xDSL out port;
a first resistor in parallel with a first winding of the first differential mode inductor, wherein the first winding of the first differential mode inductor corresponds to a tip line;
a second resistor in parallel with a second winding of the first differential mode inductor, wherein the second winding of the first differential mode inductor corresponds to a ring line;
a third resistor in parallel with a first winding of the second differential mode inductor, wherein the first winding of the second differential mode inductor corresponds to the tip line;
a fourth resistor in parallel with a second winding of the second differential mode inductor, wherein the second winding of the second differential mode inductor corresponds to the ring line;
a first capacitor in parallel with the first winding of the second differential mode inductor;
a second capacitor in parallel with the second winding of the second differential mode inductor;
a first shunt leg comprising a first end coupled between the first windings of the first and second differential mode inductors and a second end coupled between the second windings of the first and second differential mode inductors; and
a second shunt leg comprising a first end coupled to the first winding of the second differential mode inductor and a second end coupled to the second winding of the second differential mode inductor;
wherein the second differential mode inductor is coupled between the first and second shunt legs.

100. A POTS splitter, consisting essentially of:
a high-pass filter for coupling between an xDSL in port and an xDSL out port; and
a low-pass filter for coupling between the xDSL out port and a POTS port, wherein the low-pass filter comprises:
a first differential mode inductor in series with a second differential mode inductor between the POTS port and the xDSL out port;
a common mode inductor in series with the first and second differential mode inductors between the POTS port and the xDSL out port;
a first resistor in parallel with a first winding of the first differential mode inductor, wherein the first winding of the first differential mode inductor corresponds to a tip line;
a second resistor in parallel with a second winding of the first differential mode inductor, wherein the second winding of the first differential mode inductor corresponds to a ring line;
a third resistor in parallel with a first winding of the second differential mode inductor, wherein the first winding of the second differential mode inductor corresponds to the tip line;
a fourth resistor in parallel with a second winding of the second differential mode inductor, wherein the second winding of the second differential mode inductor corresponds to the ring line;
a first capacitor in parallel with the first winding of the second differential mode inductor;
a second capacitor in parallel with the second winding of the second differential mode inductor;
a first shunt leg comprising a first end coupled to the tip line and a second end coupled to the ring line; and
a second shunt leg comprising a first end coupled to the tip line and a second end coupled to the ring line;
wherein the second differential mode inductor is coupled between the first and second shunt legs; and
wherein the common mode inductor is coupled between the second shunt leg and the second differential mode inductor.

101. A telecommunications system, comprising:
a carrier;
a high-pass filter coupled between the carrier and an xDSL transceiver; and
a low-pass filter coupled between the carrier and a POTS transceiver, wherein the low-pass filter comprises:
a first differential mode inductor in series with a second differential mode inductor between the POTS transceiver and the carrier;
first and second resistors in parallel with the first differential mode inductor;
third and fourth resistors in parallel with the second differential mode inductor;
a first capacitor in parallel with the third resistor;
a second capacitor in parallel with the fourth resistor;
a first shunt leg interposed between the first and second differential mode inductors and coupled across the first and second differential mode inductors; and
a second shunt leg coupled across the second differential mode inductor.

102. A telecommunications system, comprising:
a carrier;
a high-pass filter coupled between the carrier and an xDSL transceiver; and
a low-pass filter coupled between the carrier and a POTS transceiver, wherein the low-pass filter comprises:

a first differential mode inductor in series with a second differential mode inductor between the POTS transceiver and the carrier, wherein the first differential mode inductor has an inductance value of approximately 21 mH and wherein the second differential mode inductor has an inductance value of approximately 21 mH;

first and second resistors in parallel with the first differential mode inductor, wherein the first and second resistors each have resistance values in the range of approximately 4.75 kΩ to approximately 5.11 kΩ;

third and fourth resistors in parallel with the second differential mode inductor, wherein the third and fourth resistors each have resistance values in the range of approximately 15 kΩ to approximately 30.1 kΩ;

a first capacitor in parallel with the third resistor, wherein the first capacitor has a capacitance value of approximately 0.0022 μF;

a second capacitor in parallel with the fourth resistor, wherein the second capacitor has a capacitance value of approximately 0.0022 μF;

a first shunt leg interposed between the first and second differential mode inductors and coupled across a first and second winding of the first differential mode inductor, wherein the first shunt leg comprises a third capacitor having a capacitance value of approximately 0.01 μF; and a second shunt leg coupled across a first and second winding of the second differential mode inductor, wherein the second shunt leg comprises a fourth capacitor having a capacitance value of approximately 0.068 μF;

wherein second differential mode inductor is interposed between the first shunt leg and the second shunt leg.

103. A telecommunications system, comprising:

a carrier;

a high-pass filter coupled between the carrier and an xDSL transceiver; and a low-pass filter coupled between the carrier and a POTS transceiver, wherein the low-pass filter comprises:

a first differential mode inductor in series with a second differential mode inductor between the POTS transceiver and the carrier, wherein the first differential mode inductor has an inductance value of approximately 22 mH and wherein the second differential mode inductor has an inductance value of approximately 8 mH;

a common mode inductor in series with the first and second differential mode inductors between the POTS transceiver and the carrier, wherein the common mode inductor has an inductance value of approximately 10 mH;

first and second resistors in parallel with the first differential mode inductor, wherein the first and second resistors each have a resistance value of approximately 3.01 kΩ;

third and fourth resistors in parallel with the second differential mode inductor, wherein the third and fourth resistors each have a resistance value of approximately 5.62 kΩ;

a first capacitor in parallel with the third resistor, wherein the first capacitor has a capacitance value of approximately 0.0056 μF;

a second capacitor in parallel with the fourth resistor, wherein the second capacitor has a capacitance value of approximately 0.0056 μF;

a first shunt leg interposed between the first and second differential mode inductors and coupled across a first and second winding of the first differential mode inductor, wherein the first shunt leg comprises a third capacitor having a capacitance value of approximately 0.027 μF and a fifth resistor coupled in series with the third capacitor and having a resistance value of approximately 20Ω; and a second shunt leg coupled across a first and second winding of the common mode inductor, wherein the second shunt leg comprises a fourth capacitor having a capacitance value of approximately 0.051 μF and a sixth resistor coupled in series with the fourth capacitor and having a resistance value of approximately 20Ω;

wherein second differential mode inductor is interposed between the first shunt leg and the second shunt leg; and wherein the common mode inductor is interposed between the second shunt leg and the second differential mode inductor.

104. A telecommunications system, comprising:

a carrier having a tip line and a ring line;

a high-pass filter coupled between the carrier and an xDSL transceiver; and a low-pass filter coupled between the carrier and a POTS transceiver, wherein the low-pass filter comprises:

a first differential mode inductor having a first winding and a second winding, wherein the first winding corresponds to the tip line and the second winding corresponds to the ring line;

a second differential mode inductor in series with the first differential mode inductor and having a first winding and a second winding, wherein the first winding corresponds to the tip line and the second winding corresponds to the ring line;

a first resistance in parallel with the first winding of the first differential mode inductor;

a second resistance in parallel with the second winding of the first differential mode inductor;

a third resistance in parallel with the first winding of the second differential mode inductor;

a fourth resistance in parallel with the second winding of the second differential mode inductor;

a first capacitance in parallel with the third resistance;

a second capacitance in parallel with the fourth resistance;

a first shunt leg coupled between the tip and ring lines and comprising a third capacitance in series with a fifth resistance; and a second shunt leg coupled between the tip and ring lines and comprising a fourth capacitance in series with a sixth resistance;

wherein the first shunt leg is interposed between the first and second differential mode inductors; and wherein the second differential mode inductor in interposed between the first and second shunt legs.

105. The telecommunications system of claim 104, further comprising a common mode inductor in series with the first and second differential mode inductors and interposed between the second shunt leg and the second differential mode inductor.

106. A method of impedance matching in a POTS splitter of a telecommunications system for sharing a common carrier between xDSL service and POTS service, the method comprising:

passing a first signal on a tip line between a POTS transceiver and the carrier, wherein the first signal passes through a first winding of a first differential mode inductor and a first winding of a second differential mode inductor in series while a first resistance is in parallel with the first winding of the first differential mode inductor, a second resistance is in parallel with the first winding of the second differential mode inductor and a first capacitance is in parallel with the first winding of the second differential mode inductor and the second resistance;

passing a second signal on a ring line between a POTS transceiver and the carrier, wherein the second signal passes through a second winding of the first differential mode inductor and a second winding of the second differential mode inductor in series while a third resistance is in parallel with the second winding of the first differential mode inductor, a fourth resistance is in parallel with the second winding of the second differential mode inductor and a second capacitance is in parallel with the second winding of the second differential mode inductor and the fourth resistance.

107. The method of claim 106, further comprising:

providing a first shunt across the tip and ring lines; and providing a second shunt across the tip and ring lines;

wherein the first shunt is interposed between the first and second differential mode inductors; and wherein the second differential mode inductor is interposed between the first and second shunts.

108. The method of claim 107, wherein providing a shunt across the first and second windings of the second differential mode inductor further comprises providing a capacitance across the first and second windings of the second differential mode inductor.

109. The method of claim 107, wherein providing a shunt across the first and second windings of the second differential mode inductor further comprises providing a capacitance in series with a resistance across the first and second windings of the second differential mode inductor.

110. The method of claim 106, further comprising passing the first signal on the tip line between a POTS transceiver and the carrier through a first winding of a common mode inductor in series with the first windings of the first and second differential mode inductors.

111. The method of claim 110, further comprising passing the second signal on the ring line between a POTS transceiver and the carrier through a second winding of the common mode inductor in series with the second windings of the first and second differential mode inductors.

* * * * *